United States Patent [19]

Yang

[11] Patent Number: 4,577,930
[45] Date of Patent: Mar. 25, 1986

[54] WEAK BOUNDARY STORAGE LIQUID CRYSTAL DISPLAY DEVICES WITH BIAS VOLTAGE

[75] Inventor: Kei-Hsiung Yang, Somers, N.Y.

[73] Assignee: International Business Machines Corporation, Armonk, N.Y.

[21] Appl. No.: 381,281

[22] Filed: May 24, 1982

[51] Int. Cl.$^4$ .................................... G02F 1/133
[52] U.S. Cl. .................................... 350/332; 350/340
[58] Field of Search ............... 350/346, 347 E, 331 R, 350/340, 332

[56] References Cited

U.S. PATENT DOCUMENTS

| | | |
|---|---|---|
| 3,790,251 | 2/1974 | Wysocki et al. |
| 3,834,792 | 9/1974 | Janning ........................... 350/341 |
| 3,861,782 | 1/1975 | Murao et al. ............. 350/350 R X |
| 3,890,628 | 7/1975 | Gurtler ........................ 350/335 X |
| 3,914,020 | 10/1975 | Helfrich ........................... 350/340 |
| 3,914,022 | 10/1975 | Kashnow ......................... 350/340 |
| 4,119,558 | 10/1978 | Coates et al. .................. 350/331 R |
| 4,119,842 | 10/1978 | Hayden ............................. 350/346 |
| 4,264,149 | 4/1981 | Zwart ............................... 350/346 |
| 4,380,008 | 4/1983 | Kawakami et al. ............ 350/346 X |
| 4,392,719 | 7/1983 | Sekimoto ...................... 350/332 X |
| 4,411,496 | 10/1983 | Nonomura et al. ............. 350/347 E |

*Primary Examiner*—John K. Corbin
*Assistant Examiner*—David Lewis
*Attorney, Agent, or Firm*—Yen S. Yee; Thomas P. Dowd

[57] ABSTRACT

A two-electrode nematic liquid crystal display (LCD) device with inherent storage effect is described. The described storage effect LCD device, which can properly operate without refresh circuitry, can be of either the homogeneous or twisted nematic type. In accordance with the invention, the liquid crystal material-to-substrate anisotropic surface anchoring force is set sufficiently weak by surface treatment techniques, to prevent the restoration of the device to its quiescent state once the device has been driven temporarily to its active state by a temporary increase in an applied electric field.

19 Claims, 3 Drawing Figures

WEAK BOUNDARY STORAGE LIQUID CRYSTAL DISPLAY DEVICES WITH BIAS VOLTAGE

DESCRIPTION

1. Technical Field

This invention relates generally to a liquid crystal display (LCD) device, and more particularly to a nematic LCD device having storage effect.

2. Background Art

Conventional direct-view field effect liquid crystal display (LCD) devices, such as twisted nematic (TN) displays and guest-host displays having dichroic dyes as the guest in nematic or cholesteric hosts, are known. These conventional LCD devices have limited multiplex capacity because of high $V_{on}/V_{th}$ ratio, where $V_{on}$ and $V_{th}$ are the root-mean-square voltages for the device to be turned on and at threshold, respectively. Furthermore, these conventional nematic LCD devices have no storage effect, so that direct pel drive or refresh circuits are necessary for their operation. For these reasons, conventional nematic LCD devices are suitable in general only in display applications of the low information content type, such as digital watch displays.

Heretofore, field effect LCD cells, such as of the TN type, have been constructed typically as follows. A liquid crystal material having a positive dielectric anisotropy is interposed between an upper and a lower parallel glass substrate, with the molecules of the LC material parallel with the upper and lower substrates and twisted 90° therebetween. Such an LCD cell is disposed between a pair of polarizers with polarizing axes intersecting with each other at right angles. With this typical construction, light impinging upon the device is first polarized linearly by one of the polarizers. Then its polarized plane is rotated 90° by the liquid crystal molecules in a twisted arrangement and finally light transmits through the other polarizer. Where transparent electrodes formed with a pattern of a letter, digits, or other symbols are disposed on the inner surfaces of the upper and lower substrates, and are impressed with a voltage greater than the threshold voltage of the device, the LC molecules will be arranged in substantially the vertical direction or in the direction of the field. Under these conditions, the polarized plane of incident light will not be rotated by the liquid crystal molecules, thus the incident light will be intercepted by the analyzer. The pattern thus can be displayed by controlling the direction of the LC medium within the LC cell to yield a transmission and an interception of the light.

Smectic liquid crystal display devices with storage effect are known. This type of LCD device provides an indefinite storage of the information in the form of scattering regions in an otherwise clear background. More specifically, information is recorded by an intensity modulated laser beam which locally heats the LC material to create light-scattering centers. For more details see, for instance, "Laser-Addressed Liquid Crystal Projection Displays", by A. G. Dewey et al, pp. 1–7, Proceeding of the S.I.D., Vol. 19/1 (1978).

Optical storage effects in mixtures of nematic and cholesteric materials with negative dielectric anisotropy were observed and reported by Heilmeier and Goldmacher, Proceedings IEEE 57, 34 (1969). According to Heilmeier et al, a sample with no applied voltage was initially in a relatively clear state. The application of a DC or a low frequency AC voltage of a sufficient magnitude induced an intense scattering known as dynamic scattering. When the voltage was removed, the dynamic scattering disappeared, but a quasi permanent forward scattering state remained. The storage decay time was reported to be on the order of hours. Furthermore, the scattering state could be erased and returned to the clear state by the application of an audio frequency signal.

The effects of weak boundary coupling on liquid crystal display performance is reported in an article by J. Nehring et al entitled, "Analysis of Weak-Boundary-Coupling Effects in Liquid-Crystal Displays". According to the article, the multiplexing capacity of LCD devices can be improved by controlling the liquid crystal material to substrate anisotropy.

Heretofore several types of surface treatment techniques have been employed and applied in the making of liquid crystal display devices. For instance, in U.S. Pat. No. 4,140,371 entitled, "Liquid Crystal Display Devices", and issued to M. Kanazaki et al, it is described that in an LCD device the crystals may be oriented slightly inclined by the use of an orientation controlling structure formed by rubbing or oblique vapor deposition.

In order to control the alignment of the molecules of a liquid crystal material, some prior LCD devices employ surfactant coatings. For instance, in U.S. Pat. No. 3,967,883 entitled, "Liquid Crystal Devices of the Surface Aligned Type", and issued to D. Meyerhofer et al, it is described that one or more inside surfaces of an LCD device enclosure may be coated with successive slant evaporated layers for the purpose of controlling the alignment of the molecules of the liquid crystal material.

Another prior LCD device employing the surface rubbing technique is described in U.S. Pat. No. 4,083,099 entitled, "Manufacture of a Twisted Nematic Field Effect Mode Liquid Crystal Display Cell", and issued to K. Yano et al. According to this patent, the surface of the transparent insulating film of the LCD device is rubbed to form micro-grooves aligned in a predetermined direction. The two glass substrates of the LCD device carry the transparent insulating films having micro-grooves formed using this rubbing technique. In addition, the application of this rubbing technique to promote the uniformity of the LCD optical effect is also mentioned and appreciated by M. Biermann, et al, in U.S. Pat. No. 3,892,471 entitled, "Electrodes for Liquid Crystal Components".

The effects of surface treatment on the liquid crystal material-to-substrate anisotropy is described in an article entitled, "Anisotropic Interactions Between MBBA and Surface-Treated Substrates", by S. Naemura, pp. C3-514-518, Journal De Physique, Colloque C3, supplement au n° 4, Tome 40. The article reports on the easy axis and achoring strength coefficients measured on the interfaces between MBBA and substrates with various surfactants layers.

It will be seen from a careful consideration of all the foregoing art that there exists a need for an improved direct-view, high information content nematic LCD device having inherent storage effect.

DISCLOSURE OF INVENTION

It is a principal object of this invention to provide an improved direct-view, high information content nematic liquid crystal display (LCD) device.

It is a further object of this invention to provide a two-terminal LCD cell having inherent storage effect.

It is another object of the present invention to provide a low voltage, low power LCD cell having no requirement for refresh circuitry for its proper operation.

It is also an object of the present invention to provide a storage effect twisted nematic (TN) LCD cell.

It is still another object of the present invention to provide a storage effect nematic homogeneous LCD cell.

In accordance with the teaching of the present invention, a surface treatment of LCD substrates is made to set the liquid crystal material-to-substrate anisotropic surface anchoring force sufficiently weak. More specifically, before driving a liquid crystal (LC) cell into a saturation condition, an applied electric field acts against both the anisotropic surface anchoring (ASA) force and an LC long-range ordering force in order to distort the LC medium into an active state. After driving the LC cell into saturation, or its active state, the applied electric field combines with the LC long-range ordering force to oppose the ASA force for the restoration of the LC medium to it quiescent state. When the ASA force is set sufficiently weak by design, storage effect occurs when the applied electric field, after driving the LC cell into its active state for a sufficiently long period of time, is lowered to a value $V_{bias}$ wherein $V_{bias}$ is set by design such that when combined with the LC long-range ordering force is greater than the ASA force, thereby preventing the restoration of the cell to its quiescent state.

The foregoing and other objects, features and advantages of this invention will be apparent from the following more particular description of the best mode for carrying out the invention, as illustrated in the accompanying drawings.

BRIEF DESCRIPTION OF THE DRAWINGS

The details of the invention will be described in connection with the accompanying drawings, in which.

BEST MODE FOR CARRYING OUT THE INVENTION

Figure 1:
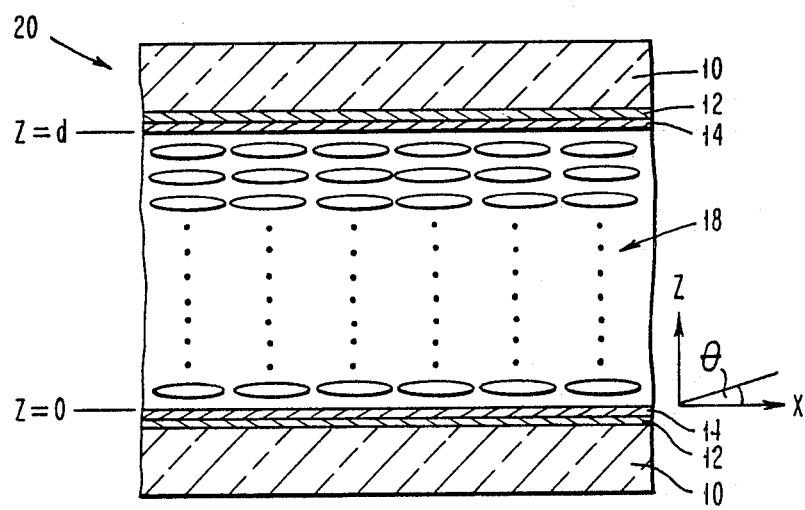
FIG. 1 is a diagrammatic cross-sectional view of a storage effect homogeneous LC cell having the LC directors positioned in a first orientation arrangement wherein the LC directors of the LC material 18 always lie in the XZ plane and are either everywhere parallel to the axes, or with a small pretilt angle $\theta$, with respect to the X axis.
Figure 2:
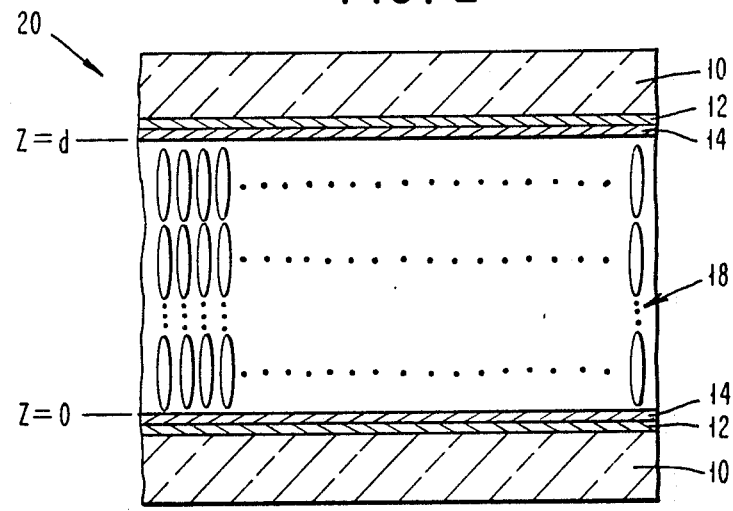
FIG. 2 is a diagrammatic cross-sectional view of either the LC cell shown in FIG. 1, or the TN cell shown in FIG. 3, having the LC directors positioned in a second orientation arrangement wherein the LC directors of the LC material 18 are everywhere perpendicular to the XY plane.
Figure 3:
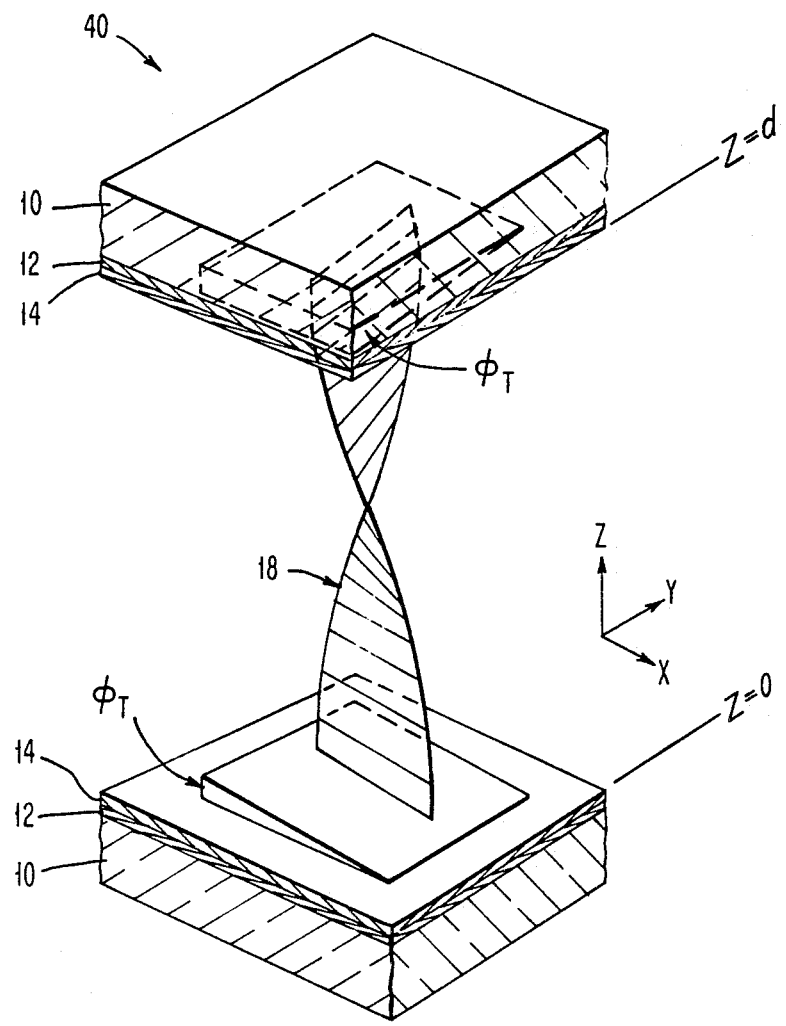
FIG. 3 is a simplified perspective view illustratively showing a first twisted orientation of the LC directors in a storage effect TN cell 40.

A preferred embodiment of a two-electrode LCD device having weak boundary storage effect according to the present invention may be either a nematic homogeneous cell 20 as illustrated in FIGS. 1 and 2, or a twisted nematic (TN) cell 40 as illustrated in FIG. 3. In both embodiments, the anisotropic surface anchoring (ASA) force is set sufficiently weak by surface treatment thereby preventing the restoration of the cell to its quiescent state once the cell (20, 40) has been driven temporarily to its active state by an externally applied electric field.

Homogeneous cells 20 may be of two types depending on whether $\Delta\epsilon = \epsilon_{11} - \epsilon_{12} > 0$ or $\Delta\epsilon < 0$, where $\epsilon_{11}$ and $\epsilon_{12}$ are the dielectric permittivities parallel and perpendicular to the long axis of the LC molecules, respectively. In both cases the LC cell 20 includes a pair of substrates 10, upper and lower electrodes 12, respectively formed on the inner surfaces of the upper and lower substrates 10, and a liquid crystal material 18 interposed between the upper and lower electrodes 12. Referring to FIGS. 1 and 2, cell 20 includes a nematic LC layer of thickness d confined between the planes $Z=0$ and $Z=d$.

For the case $\Delta\epsilon > 0$, in the quiescent state the LC directors of the LC material 18 always lie in the XZ plane and in the absence of an external electric field, the directors are either everywhere parallel to the X-axis, or with a small pretilt angle $\theta$, with respect to the X-axis.

The LC cell 20 in FIGS. 1 and 2 has substrates 10 made preferably of glass or plastic with a conductive coating, such as indium-tin oxide, forming the electrodes 12.

According to the teaching of the present invention, LC aligning layers 14 may be deposited on the inner surfaces of electrodes 12, which aligning layers 14 result in a surface treatment of the upper and lower electrodes 12 to adjust the LC material-to-substrate anisotropic surface anchoring (ASA) force below a critical value to provide a storage effect for the two-electrode homogeneous LC cell 20.

In the homogeneous LC cell 20 having $\Delta\epsilon > 0$, the threshold voltage, $V_{th}$ can be calculated as $$V_{th} = \frac{\pi v'}{\left| \frac{\epsilon_{11} - \epsilon_{12}}{k_{33}} \right|^{\frac{1}{2}}} \quad (1)$$

with $v'$ satisfying the following relation $$\mathrm{Cot}\left[ \frac{\pi}{2} v' \left( \frac{k_{33}}{k_{11}} \right)^{\frac{1}{2}} \right] = \lambda v' \left( \frac{k_{33}}{k_{11}} \right)^{\frac{1}{2}} \quad (2)$$

where $k_{11}$ and $k_{33}$ are the LC splay and bend elastic constants, respectively. The constant $\lambda$ is expressed as $$\lambda = \pi k_{33}/Cd \quad (3)$$

where C is the anisotropic surface anchoring (ASA) energy per unit area.

In order to cause the molecules of the LC material 18 to orient from a first orientation arrangement, as illustrated in FIG. 1, to a second orientation arrangement, as illustrated in FIG. 2, the externally applied voltage (not shown) on the electrodes 12 must be raised to a saturation voltage level to create a saturation field in the Z direction in between the electrodes 12. This saturation voltage can be determined by $$V_{sat} = \frac{\pi \nu''}{\left|\frac{\epsilon_{11} - \epsilon_{12}}{k_{33}}\right|^{\frac{1}{2}}} \qquad (4)$$

with $\nu''$ satisfying the following relation, $$\coth[\tfrac{1}{2}\pi\nu''] = \lambda\nu'' \qquad (5)$$

and with $k_{11}$ and $k_{33}$ and C as defined hereinabove.

In accordance with the teachings of the present invention, in operating the LCD device containing a number of the LC cells 20 as shown in FIG. 1, each cell 20 must be biased by an externally applied voltage source at a voltage $V_{bias}$ which is less than or equal to the threshold voltage $V_{th}$. The conventional line-at-a-time, three-to-one, or two-to-one matrix addressing scheme is, then, used to turn the LC cell 20 on. Each of these addressing schemes is known to one of ordinary skill in this art. For example, an article by B. J. Lechner, et al, in Proceedings IEEE 59, 1566 (1971) describes different multiplex or matrix addressing schemes for driving LCD devices.

In order to turn on a particular picture element (PEL) the appropriate corresponding row and column electrodes are selected and the applied voltage raised. Upon being raised to a saturation voltage, the applied electric field acts against both the LC material-to-substrate anisotropic surface anchoring ASA force and the liquid crystal 18 long-range ordering force to distort the liquid crystal material 18 so as to switch the LC molecules from a first orientation arrangement, as illustrated in FIG. 1, to a second orientation arrangement, as illustrated in FIG. 2. After being raised to the saturation voltage level, the applied voltage is then lowered to a quiescent level, $V_{bias}$.

According to the teaching of the present invention the LC aligning layer 14 is set so as to provide a suitable ASA energy per unit area (C) such that $$\lambda = \pi k_{33}/Cd \geq 2.0 \qquad (6)$$

When the ASA force is set in accordance with this criterion, the applied electric field created by the applied voltage at the $V_{bias}$ level combines with the liquid crystal long-range ordering force to counteract the liquid crystal material-to-substrate ASA force to prevent the restoration of cell 20 from the second orientation arrangement as in FIG. 2 to the first orientation arrangement thereby producing a storage effect in cell 20.

Since the LC cell 20 remains in the second orientation arrangement under the constant $V_{bias}$, $\leq V_{th}$, no refresh is required and no refresh circuit is needed for its proper operation.

Erasure of the stored active state, or the restoration of the second orientation arrangement to the first orientation arrangement, (the quiescent state), can be effected by removing the bias field, or by reducing it to a sufficiently low value so as to allow the ASA force to prevail.

In a preferred embodiment, MBBA, a liquid crystal material with $\Delta\epsilon < 0$ may be used to make a storage effect homogeneous LC cell 20. In this case, in order for equations 1, 2, 3 and 4 to apply for an LC material having $\Delta\epsilon < 0$, the constants $k_{11}$ and $k_{33}$ in these equations should be interchanged. Furthermore, since $\Delta\epsilon < 0$ for MBBA, the quiescent state for such a homogeneous LC cell 20 is as shown in FIG. 2 and the active state, after the cell 20 has been driven into saturation, is as shown in FIG. 1.

In this preferred embodiment, the electrodes 12 are made of indium-tin oxide (ITO), or other suitable conductive coating. DMOAP (N, N-dimethyl-N-octadecyl-3-aminopropyl trimethoxysilyl chloride), a surfactant is used to form the LC-aligning layer 14.

A typical procedure to deposit DMOAP on electrodes 12 to form the LC-aligning layers 14 is to clean thoroughly the substrates 10 containing the electrodes 12 so as to remove any organic and inorganic residues. After cleaning, the substrates 10 are then dipped into a diluted solution of DMOAP (typically 0.1% by volume in water). The diluted solution containing the substrates 10 is agitated for about five minutes at room temperature. The substrates 10 are then rinsed in the deionized water in order to remove excess DMOAP. Excess water is then removed with clean $N_2$, and finally the DMOAP-coated substrates 10 are further cured in dry $N_2$, typically at about 110° for approximately one hour.

In this preferred embodiment, the C value, as measured by the attenuated-total-reflection method, is about $1.1 \times 10^{-2}$ erg/cm². With $k_{11}$ equal to $8.4 \times 10^{-7}$ dynes and $k_{33}$ equal to $9.5 \times 10^{-7}$ dynes, the storage effect homogenous LC cell according to the teachings of the present invention should have an LC layer thickness, d less than or at about 1.2 μm in order to satisfy the design equations 3 and 6.

Alternatively, if in the preferred embodiment, the choice of DMOAP surfactant coating 14 is replaced by selecting hexadecylamine instead, a C value of about $3.5 \times 10^{-3}$ erg/cm² has been measured. In this case, an LC layer thickness, d less than or at about 3.8 μm would be necessary in order to produce a storage effect homogenous LC cell 20 using MBBA as a LC material 18.

As stated hereinabove, the teachings of the present invention are also applicable to another class of LC devices known as twisted nematic (TN) displays. TN LCD devices and their uses are heretofore known. In general, with no applied voltage, the surface layers of the liquid crystal material 18 (FIG. 3) are homogeneously aligned, but with a twist angle of 90° between the two substrates 10 of the TN cell 40. The bulk fluid distorts so as to provide a continuous rotation from one cell wall to the other. For TN cells 40 having an LC material such that $\Delta\epsilon > 0$, applied voltages at electrodes 12 exceeding the threshold voltage, $V_{th}$ cause the nematic directors to become untwisted and to align parallel to the applied field in much the same way as illustrated in FIG. 2 for the homogeneous LC cells. For more details, see L. A. Goodman, in a paper entitled, "Liquid Crystal Displays", pp. 804–823, Journal of Vacuum Science Technology, Vol. 10, No. 5 (1973).

Referring to FIG. 3, the weak boundary storage effect TN LC cell 40 includes a pair of substrates 10, upper and lower electrodes 12, respectively formed on the inner surfaces of the upper and lower substrates 10, and a liquid crystal material 18 interposed between the upper and lower electrodes 12. Referring to FIG. 3, cell 40 includes a nematic LC layer of thickness d confined between the planes Z=0 and Z=d. According to the teaching of the present invention, LC-aligning layers 14 result in a surface treatment of the upper and lower electrodes 12 to adjust the LC material-to-substrate anisotropic surface anchoring (ASA) force below a critical value to provide a storage effect for the two-electrode TN cell 40.

Referring to FIG. 3, the threshold voltage of the TN cell 40 can be calculated from the following equation.

$$V_{th} = \frac{\pi v'}{\left|\frac{\epsilon_{11} - \epsilon_{12}}{k_{33}}\right|^{\frac{1}{2}}} \quad (7)$$

with $v'$ satisfying the following relation:

$$\cot\left[\frac{1}{2}\left(\frac{(2k_{22} - k_{33})\phi_T^2 + k_{33}\pi^2 v'^2}{k_{11}}\right)^{\frac{1}{2}}\right] = \frac{\lambda}{\pi}\left(\frac{(2k_{22} - k_{33})\phi_T^2 + k_{11}^2\pi^2 v'^2/k_{33}}{k_{11}}\right)^{\frac{1}{2}} \quad (8)$$

where $k_{22}$ is the twist elastic constant of the nematic LC material 18, and $\phi_T$ denotes the angle of the initial twist which is $\pi/2$ for the TN cell 40. The corresponding saturation voltage can be determined by $$V_{sat} = \frac{\pi v''}{\left|\frac{\epsilon_{11} - \epsilon_{12}}{k_{33}}\right|^{\frac{1}{2}}} \quad (9)$$

$v''$ satisfying the following relation.

$$\coth[\tfrac{1}{2}((2k_{22} - k_{33})\phi_T^2/k_{33} + \pi^2 v''^2)^{\frac{1}{2}}] = \frac{\lambda}{\pi}((2k_{22} - k_{33})\phi_T^2/k_{33} + \pi^2 v''^2)^{\frac{1}{2}} \quad 10$$

The constant $\lambda$ in equations 8 and 10 is as specified in equation 3 hereinabove.

For constructing memory effect TN cell 40, it is preferable to use nematic LC materials or a mixture with $(2k_{22} - k_{33}) < 0$ and $\Delta\epsilon > 0$.

In order to turn on a particular picture element in a matrix containing a number of TN cells 40, the appropriate corresponding row and column electrodes are selected and the applied voltage raised. Upon being raised to a saturation voltage, the applied electric field acts against both the LC material-to-substrate ASA force and the liquid crystal long-range ordering force to distort the liquid crystal material 18 so as to switch the LC directors from a first twisted orientation arrangement as illustrated in FIG. 3 to a second untwisted orientation arrangement as illustrated in FIG. 2.

After reaching the saturation voltage, the applied voltage is then lowered to a quiescent level, $V_{bias}$ which is less than or equal to $V_{th}$.

As described hereinabove for the case for storage effect homogeneous LC cells 20, the LC aligning layers 14 are also set to provide a suitable ASA energy per unit area (C) such as to satisfy design equation 6 hereinabove. When the ASA force is set in accordance with this criterion, the applied electric field at the $V_{bias}$ level combines with the liquid crystal long-range ordering force to counteract the liquid crystal material-to-substrate ASA force to prevent the restoration of cell 40 from the second orientation arrangement as illustrated in FIG. 2 to the first orientation arrangement as illustrated in FIG. 3, thereby producing a storage effect in TN cell 40. Since the TN cell 40 remains in the second orientation arrangement under the constant $V_{bias}$, no refresh is required and no refresh circuit is needed for its proper operation.

Again, as stated hereinabove, erasure of the stored active state, or the restoration of the second orientation arrangement to the first orientation arrangement (the quiescent state), can be effected by removing the bias field, or by reducing it to a sufficiently low value so as to allow the ASA force to prevail.

As a preferred storage effect TN LC cell embodiment, 6CB (4-cyano-4'-n-hexylbiphenyl), a nematic LC material 18 having $\Delta\epsilon > 0$ may be used to make a storage effect TN LC cell 40. With 6CB, $k_{11} = 9 \times 10^{-7}$ dynes, $k_{22} = 4.5 \times 10^{-7}$ dynes, and $k_{33} = 1.2 \times 10^{-6}$ dynes at room temperature have been measured. The LC aligning layers 14 can be formed with SiO using the oblique evaporation technique.

In this storage effect TN cell preferred embodiment, the C value is measured to be about $4.6 \times 10^{-3}$ ergs/cm$^2$. With the $k_{11}$, $k_{22}$, $k_{33}$ parameters corresponding to 6CB state hereinabove, the LC layer thickness, d of the TN cell 40 should be less than or equal to approximately 4.1 $\mu$m in order to satisfy the design equation 6.

The above-described preferred embodiments provide a new class of storage effect LCD devices. An LCD device comprising a matrix array of storage effect LCD cells according to the teachings of the present invention eliminate the requirement of refresh and do away with the need for refresh circuitry as in conventional LCD devices.

The invention described is particularly beneficial when applied to the realization of large panel high information content LCD devices, the size of which has been heretofore limited by both the nonstorage nature of conventional LCD devices, and their low multiplex capacity because of the high $V_{sat}/V_{th}$ ratio.

While the LC aligning layers 14 are formed by surfactant coating technique, and by oblique evaporation technique for the homogeneous and the TN cells, 20, 40, respectively, it is clear that such LC aligning layers 14 maybe formed using either of these techniques or a combination thereof. Alternatively, the same effect could be created by rubbing or other suitable surface treatment techniques.

Although the storage effect homogeneous LC cell 20 is shown and described in conjunction with using MBBA as the LC material or mixture 18, other LC mixtures are also possible. As additional examples of suitable LC materials for making storage effect homogeneous LC cells, twenty additional commercially available LC materials and their important parameters are listed in Table I. To produce storage effect homogeneous LC cells according to the teaching of the present invention, the parameter $\lambda$ of design equation 6 should be made greater than the parameter $\lambda_s$ shown on the fourth column of Table I.

Although the storage effect TN LC cell 40 is shown and described in conjunction with using 6CB as the LC material or mixture 18, other LC mixtures are also possible. As additional examples of such suitable LC materials for making storage effect TN LC cell 40, the twenty commercially available LC materials and their corresponding important parameters are listed in Table II. To produce storage effect TN LC cells 40 according to the teachings of the present invention, the parameter λ of the design equation 6 should be made greater than the parameter $\lambda_s$ shown on the sixth column of Table II.

Two additional major variations to the embodiments described hereinabove should also be noted. First, a minute amount of dichroic dyes (guest) may be addd to the nematic homogeneous TN cells 20, 40 (host) to form the so-called nematic guest-host LCD. The design criteria to form the weak boundary storage LCDs with dichroic dyes added are essentially similar to those without dichroic dyes described hereinabove. The second variation is to add both a minute amount of chiral compound such as cholesteryl non-anoate and a minute amount of dichroic dyes such as anthraquinine dyes to the nematic mixture 18 to form the so-called cholesteric-to-nematic phase change guest-host LCD, more details of which, for instance, are described by D. L. White and G. N. Taylor, J. of Applied Physics 45, 4718 (1974), and in U.S. Pat. No. 3,833,287. The design criteria of weak-boundary storage, cholesteric-to-nematic phase change guest-host LCDs are also substantially similar to those of TN cells shown and described hereinabove.

From the preceding detailed description of the applicant's invention, it can be seen that LCD devices incorporating weak boundary storage effect LC cells made in accordance with the teaching of the present invention have advantages heretofore not possible to achieve. In addition to the variations and modifications of applicant's disclosed device which have been suggested, many other variations and modifications will be apparent to those skilled in this art and accordingly, the scope of applicant's invention is not to be construed to be limited to the particular embodiments shown or suggested.

TABLE I

HOMOGENEOUS CELL

| LC Mixtures | $k_{33}$ | $\Delta\epsilon$ | $V_{th}$ | $\lambda_s$ |
|---|---|---|---|---|
| TN200 | 19.0 | 18.44 | 0.454 | 2.36 |
| TN201 | 25.4 | 21.10 | 0.504 | 2.30 |
| TN211 | 17.6 | 17.6 | 0.48 | 2.20 |
| TN103 | 18.6 | 26.2 | 0.404 | 2.20 |
| TN132 | 15.9 | 22.2 | 0.406 | 2.20 |
| TN403 | 23.10 | 19.18 | 0.506 | 2.29 |
| TN430 | 18.30 | 17.50 | 0.482 | 2.24 |
| E7 | 20.7 | 13.8 | 0.562 | 2.30 |
| ZLI1132 | 21.0 | 10.4 | 0.612 | 2.45 |
| TN621 | 16.9 | 15.8 | 0.510 | 2.14 |
| TN605 | 19.8 | 13.2 | 0.585 | 2.21 |
| TN623 | 19.4 | 17.2 | 0.534 | 2.10 |
| TN701 | 14.4 | 23.7 | 0.374 | 2.20 |
| TN701C | 14.4 | 23.7 | 0.374 | 2.20 |
| TN615 | 13.9 | 12.7 | 0.526 | 2.10 |
| TN615C | 13.9 | 12.7 | 0.526 | 2.10 |
| TN619 | 10.9 | 5.8 | 0.724 | 2.00 |
| TN619C | 10.9 | 5.8 | 0.724 | 2.00 |
| TN703 | 14.6 | 12.9 | 0.515 | 2.18 |
| TN703C | 14.6 | 12.9 | 0.515 | 2.18 |

TABLE II

| LC Mixtures | $k_{11}$ $10^{-7}$ dynes | $k_{22}$ | $k_{33}$ | $\Delta\epsilon$ | $\lambda_s$ | $V_{th}$ (volts) |
|---|---|---|---|---|---|---|
| TN200 | 8.8 | 8.35 | 19.0 | 18.44 | 2.35 | 0.320 |
| TN201 | 13.03 | 13.30 | 25.4 | 21.10 | 3.10 | 0.265 |
| TN211 | 11.10 | 10.20 | 17.6 | 17.6 | 4.00 | 0.203 |
| TN103 | 11.4 | 7.30 | 18.6 | 26.2 | 2.0 | 0.363 |
| TN132 | 9.7 | 7.8 | 15.9 | 22.2 | 2.49 | 0.281 |
| TN403 | 12.6 | 10.8 | 23.10 | 19.18 | 2.43 | 0.357 |
| TN430 | 10.7 | 9.10 | 18.30 | 17.5 | 2.59 | 0.319 |
| E7 | 10.7 | 10.0 | 20.7 | 13.8 | 2.60 | 0.360 |
| ZLI1132 | 8.7 | 9.0 | 21.0 | 10.4 | 2.32 | 0.434 |
| TN621 | 12.0 | 6.72 | 16.9 | 15.8 | 1.94 | 0.491 |
| TN605 | 12.1 | 6.78 | 19.8 | 13.2 | 1.85 | 0.581 |
| TN623 | 14.7 | 7.06 | 19.4 | 17.2 | 1.82 | 0.560 |
| TN701 | 9.0 | 5.4 | 14.4 | 23.7 | 1.93 | 0.354 |
| TN701C | 9.0 | 5.4 | 14.4 | 23.7 | 1.93 | 0.354 |
| TN615 | 10.0 | 5.25 | 13.9 | 12.7 | 1.88 | 0.519 |
| TN615C | 10.0 | 5.25 | 13.9 | 12.7 | 1.88 | 0.519 |
| TN619 | 11.1 | 5.22 | 10.9 | 5.8 | 1.91 | 0.762 |
| TN619C | 11.1 | 5.22 | 10.9 | 5.8 | 1.91 | 0.762 |
| TN703 | 9.6 | 5.47 | 14.6 | 12.9 | 1.91 | 0.499 |
| TN703C | 9.6 | 5.47 | 14.6 | 12.9 | 1.91 | 0.499 |

Having thus described my invention, what I claim as new, and desire to secure by Letters Patent is:

1. In a liquid crystal display cell of the type comprising:

upper and lower spaced substrates;

upper and lower electrodes respectively formed on the inner surfaces of said upper and lower substrates;

liquid crystal material interposed between said upper and lower electrodes;

means for imposing an electric field between said upper and lower electrodes having an adjustable range from a bias voltage with a magnitude below a threshold level for said liquid crystal material to a voltage exceeding said threshold level and sufficient for causing the molecules of said liquid crystal material to orient from a first orientation arrangement to a second orientation arrangement; and means on said upper and lower electrodes providing a surface treatment of said upper and lower electrodes adjacent said liquid crystal material;

the improvement wherein said liquid crystal material is a nematic liquid crystal material, having both its boundary layer and bulk molecules aligned in said first orientation in the field free state, and a storage effect is achieved by:

said surface treatment means rendering the liquid crystal material-to-substrate anisotropic surface anchoring force sufficiently weak so as to prevent the restoration of said molecules from said second orientation to said first orientation arrangement, when said electric field is lowered from above said threshold level to said bias voltage.

2. A liquid crystal display cell as set forth in claim 1 wherein said rendering means comprises a surface treatment by oblique evaporation of a liquid crystal aligning layer on each of said upper and lower electrodes.

3. A liquid crystal display cell as set forth in claim 2 wherein said liquid crystal aligning layers are SiO, and said liquid crystal material is 4-cyano-4'-n-hexylbiphenyl, also commonly known as 6CB.

4. A storage effect liquid crystal display cell comprising:

upper and lower spaced substrates;

upper and lower electrodes respectively formed on the inner surfaces of said upper and lower substrates;

a nematic liquid crystal material, having both its boundary layer and bulk molecules in alignment in the field free state, interposed between said upper and lower electrodes;

means for imposing an electric field between said upper and lower electrodes having an adjustable range from a bias voltage with a magnitude below a threshold level for said liquid crystal material to a voltage exceeding said threshold level with a magnitude sufficient for causing the molecules of said nematic liquid crystal material to orient from a first orientation arrangement to a second orientation arrangement; and means on the surface of said upper and lower electrodes adjacent said nematic liquid crystal material, for setting the liquid crystal material-to-substrate anisotropic surface anchoring force in accordance with the relationship $$\pi k_{33}/Cd \geq 2.0$$

wherein $\pi$ is the constant 3.14159..., $k_{33}$ is the liquid crystal bend elastic, C is the liquid crystal material-to-substrate anisotropic surface anchoring energy per unit area, and d is the thickness of said liquid crystal material whereby the restoration of said molecules from said second orientation arrangement to said first orientation arrangement is prevented when said electric field is lowered from above said threshold level to said bias voltage.

5. A storage effect liquid crystal display cell as set forth in claim 2 wherein said means on the surface of said upper and lower electrodes comprises a surface treatment by oblique evaporation of a liquid crystal aligning layer on each of said upper and lower electrodes.

6. A storage effect liquid crystal display cell as set forth in claim 5, wherein said liquid crystal aligning layers are SiO, and said liquid crystal material is 4-cyano-4'-n-hexylbiphenyl, also commonly known as 6CB.

7. A storage effect liquid crystal display cell comprising:
upper and lower spaced substrates;
upper and lower electrodes respectively formed on the inner surface of said upper and lower substrates;
a nematic liquid crystal material having both its boundary layer and bulk molecules in alignment in a first orientation arrangement in the field free state, interposed between said upper and lower electrodes;
means for imposing an electric field between said upper and lower electrodes having a range from a bias voltage with a magnitude below a threshold level for said nematic liquid crystal material to a voltage exceeding said threshold level and sufficient for causing the molecules of said liquid crystal material to orient from said first orientation arrangement to a second orientation arrangement; and
surfactant coating means, between each of said upper and lower electrodes and said liquid crystal material, forming liquid crystal aligning layers on said electrodes, for setting the liquid crystal material-to-substrate anisotropic surface force sufficiently weak so as to prevent the restoration of said molecules from said second orientation arrangement to said first orientation arrangement, when said electric field is lowered from above said threshold level to said bias voltage.

8. A storage effect liquid crystal display cell as set forth in claim 3 wherein said surfactant coating means comprises, N, N-dimethyl-N-octadecyl-3-aminopropyl trimethoxy silyl chloride, commonly known as DMOAP, and said nematic liquid crystal material is 4-methoxybenzylidene-4'-n-butylaniline, also commonly known as MBBA.

9. A storage effect liquid crystal display cell as set forth in claims 6 or 8, wherein said means for imposing an electric field is a controllable voltage source connected to said upper and lower electrodes.

10. A method of constructing a nematic liquid crystal dislpay with storage effect, comprising the steps of:
providing upper and lower spaced substrates;
forming upper and lower electrodes respectively on the inner surface of said upper and lower substrate;
interposing a nematic liquid crystal material, having both its boundary layer and bulk molecules in alignment in a first orientation arrangement in the field free state, between said upper and lower electrodes;
providing a surface treatment of said upper and lower electrodes adjacent said nematic liquid crystal material;
imposing an electric field between said upper and lower electrodes having a range from a bias voltage below a threshold level for said nematic liquid crystal material to a voltage exceeding said threshold level and sufficient for causing the molecules of said liquid crystal material to orient from said first orientation arrangement to a second orientation arrangement;
and wherein said surface treatment is adapted for setting the liquid crystal material-to-substrate anisotropic surface anchoring force sufficiently weak so as to prevent the restoration of the molecules of said nematic liquid crystal material to said first orientation arrangement when said electric field is lowered from above said threshold level to said bias voltage thereby providing a storage effect for said liquid crystal display.

11. A method according to claim 10 wherein the step of said surface treatment is carried out by depositing a surfactant coating on each of said upper and lower electrodes forming liquid crystal aligning layers thereon.

12. A liquid crystal display cell as set forth in claim 11 wherein said surfactant coatings are formed with N, N-dimethyl-N-octadecyl-3-aminopropyl trimethoxy silyl, chloride, commonly known as DMOAP, and said nematic liquid crystal material is 4-methoxybenzylidene-4'-n-butylaniline, also commonly known as MBBA.

13. A method according to claim 10 wherein the step of said surface treatment is carried out by oblique evaporation of a liquid crystal aligning layer on each of said upper and lower electrodes.

14. A method according to claim 13 wherein said liquid crystal aligning layers are SiO, and said liquid crystal material is 4-cyano-4'-n-hexylbiphenyl, also commonly known as 6CB.

15. A method of constructing a nematic liquid crystal display having storage effect comprising the steps of:
providing upper and lower spaced substrates;
forming upper and lower electrodes respectively on the inner surfaces of said upper and lower substrates;
interposing a nematic liquid crystal material, having both its boundary layer and bulk molecules in alignment in the field free state, between said upper and lower electrodes;

providing an electric field between said upper and lower electrodes having an adjustable range from a bias voltage with a magnitude below a threshold level for said liquid crystal material to a voltage exceeding said threshold level with a magnitude sufficient for causing the molecules of said nematic liquid crystal material to orient from a first orientation arrangement to a second orientation arrangement and providing a surface treatment of said upper and lower electrodes adjacent said nematic liquid crystal material, for setting the liquid crystal material-to-substrate anisotropic surface anchoring force in accordance with the relationship $$\pi k_{33}/Cd \geq 2.0$$

wherein $\pi$ is the constant 3.14159..., $k_{33}$ is the liquid crystal bend elastic, C is the liquid crystal material-to-substrate anisotropic surface anchoring energy per unit area, and d is the thickness of said liquid crystal material, whereby the restoration of said molecules from said second orientation arrangement to said first orientation arrangement is prevented when said electric field is lowered from above said threshold level to said bias voltage.

16. A method according to claim 15, wherein the step of said surface treatment is carried out by depositing a surfactant coating on each of said upper and lower electrodes forming liquid crystal aligning layers thereon.

17. A method according to claim 16, wherein said surfactant coatings are formed with N, N-dimethyl-N-octadecyl-3-aminopropyl trimethoxy silyl chloride, commonly known as DMOAP, and said nematic liquid crystal material is 4-methoxybenzylidene-4'-n-butylaniline, also commonly known as MBBA.

18. A method according to claim 15, wherein the step of said surface treatment of said upper and lower substrates is carried out by oblique evaporation of a liquid crystal aligning layer on each of said upper and lower electrodes.

19. A method according to claim 18, wherein said liquid crystal aligning layers are SiO, and said liquid crystal material is 4-cyano-4'-n-hexylbiphenyl, also commonly known as 6CB.

* * * * *